(No Model.)
H. B. COBB.
METHOD OF MANUFACTURING TUBING.
No. 408,376. Patented Aug. 6, 1889.
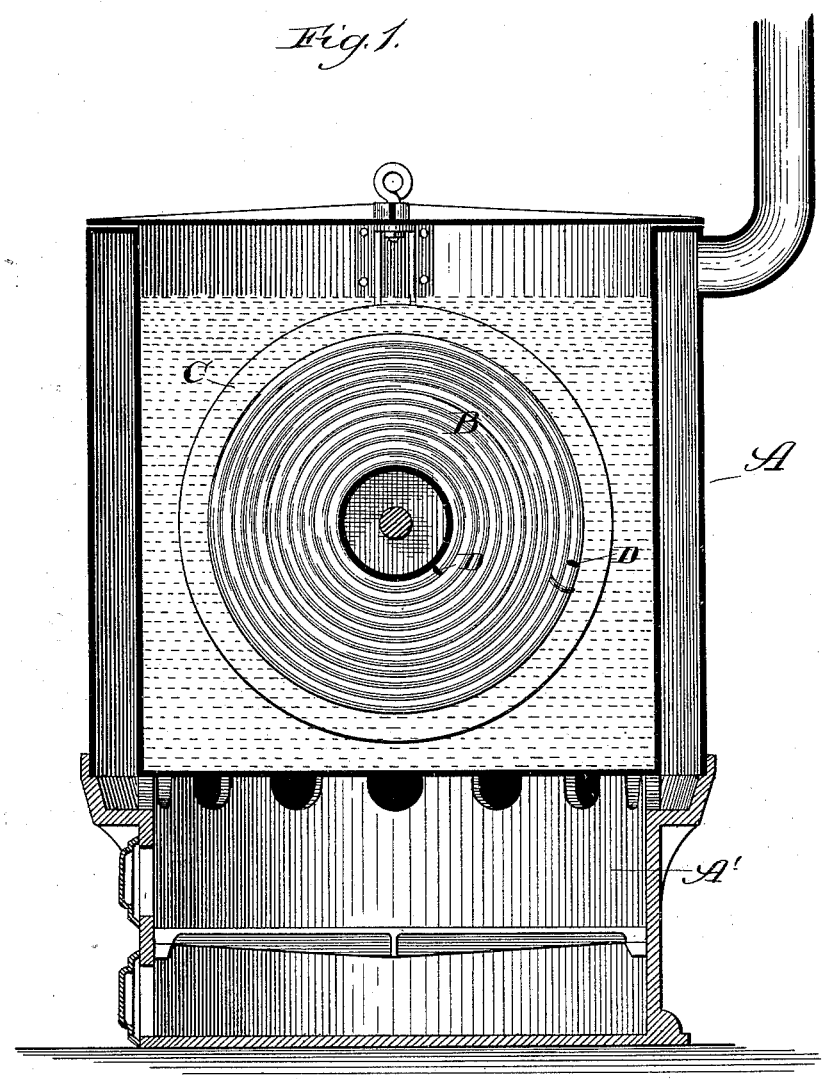
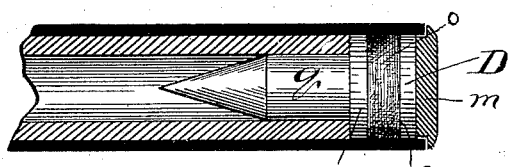
Witnesses:
Inventor:
Henry B. Cobb,
By Dyrenforth & Dyrenforth
Attys

UNITED STATES PATENT OFFICE.

HENRY B. COBB, OF WILMINGTON, DELAWARE.

METHOD OF MANUFACTURING TUBING.

SPECIFICATION forming part of Letters Patent No. 408,376, dated August 6, 1889.

Application filed October 5, 1888. Serial No. 287,271. (No model.)

*To all whom it may concern:*

Be it known that I, HENRY B. COBB, a citizen of the United States, residing at Wilmington, in the county of New Castle and State of Delaware, have invented a new and useful Improvement in the Method of Manufacturing Tubing, of which the following is a specification.

My invention relates to an improvement in the general art of producing vulcanized-rubber tubing, and more particularly to the production of a tubing of this nature in any desired length with a permanent and continuous coating of metal, such as lead; in other words, to the production of a tubing consisting of an internal tube of vulcanized rubber inclosed in a permanent continuous tubing of lead or similar metal. The tubing thus described has been patented to me as an insulator for electric wires by Letters Patent No. 288,310, dated November 13, 1883. The tubing to which I refer requires for its utmost perfection that it shall be made in continuous lengths, the greater the better; that it shall have a uniform bore of a size sufficient to receive the electric wires; that the metal-incased tubing shall have greater or less flexibility; that the vulcanized rubber shall have the greatest density consistent with the proper flexibility, and, finally, in order to meet the demand therefor in the market, that it shall be made with the utmost expedition. The production of the tubing patented to me with the least outlay of time is thus the great object of my present invention. It will be apparent, however, that steps and features of my method hereinafter claimed may be successfully used to produce vulcanized-rubber tubing generally, and I therefore do not limit myself to the production of my patented product aforesaid.

The most common of the vulcanized gums is rubber, and I have therefore confined my description to this gum; but it will be understood that the reference thereto is as to one of a class, and that the process is not limited to rubber alone.

My invention consists, broadly, in incasing a soft-gum tube combined with sulphur in a flexible metal coating, applying an expansible fluid to the interior thereof, and immersing the whole in an open vessel containing a bath heated to a vulcanizing temperature, whereby the heat of the bath vulcanizes the rubber within the flexible metal tube and heats the fluid within the tube-bath to produce a vulcanizing heat within the same and a pressure upon the rubber, increasing with the temperature, the incasing-metal tube forming an effectual external resistance to the pressure.

My invention further consists in the method described, in which a permanent metal coating is applied to the rubber tube before vulcanizing; also, in the other details and steps hereinafter described and claimed.

The accompanying drawings represent a convenient apparatus for carrying out my method.

Figure 1 shows in sectional elevation an open vessel containing melted paraffine heated by suitable means to a high or vulcanizing temperature and having immersed in it a reel carrying a coil of continuous plastic (soft rubber) tubing coated with metal and filled with air or water confined within it. Fig. 2 is a broken sectional view of the end of the tube, showing the means I prefer for plugging after introducing the air or water.

A is a vat containing hot paraffine or other liquid capable of being heated to the proper temperature for vulcanizing without sealing the receptacle in which it is contained, and the vat is mounted on a suitable heater A'. The vessel A may have a removable cover and may have also a controllable opening for regulating the temperature common in such vessels, or may be entirely open.

B is a lead-covered tube, of plastic rubber, combined with sulphur, coiled on a reel C. Before immersing the coil in the paraffine the tube is filled with water or air preferably under pressure, when each end is closed by means of a plug D, comprising the head $r$ and tapering shank $q$, the head having a circular recess $p$, containing a suitable fibrous backing $o$, such as wick. To apply the plug, it is forced into the lead-covered tube, thereby compressing the end of the plastic tubing, when it is secured in place by soldering, as at $m$. Other means for plugging may be employed. When I introduce air into the tubing, I prefer to do so under a pressure of about forty pounds. I find that under the conditions presently explained the internal pressure in this case reaches about to one hundred and forty pounds, but may be less or more.

The paraffine within the vessel A is heated to a vulcanizing temperature, which is insufficient to soften the lead coating, and also heats the contained air or water, causing it to expand and exerts a pressure from within the metal tube, while at the same time the heat of the paraffine and the contained fluid vulcanizes the rubber, the process of vulcanizing being necessarily more rapid than the process of compression. The lead or other metal tubing offers sufficient resistance to permit the rubber to be greatly compacted from within without necessitating the use of any other counter-pressure. This is very important, as it serves to enable me to use an open vessel, or one which may be readily opened, for the vulcanizing-bath, the advantage of which will presently appear. Instead of paraffine or other liquids, sand may be used, or any other medium capable of holding in an open vessel a vulcanizing temperature.

By my method any degree of flexibility or pliability may be given to the tubing, and the process of vulcanization stopped almost instantaneously at any stage. Separate pieces of tubing prepared under the same conditions with the coil may be introduced at the same time into the bath to serve on removal and inspection as an index to the condition of the coil.

When the proper condition is reached, as thus indicated, the coil may be immediately removed and cooled with water, or otherwise, when, if the lead or other permanent flexible metal coating is intended to be left on the tubing, the product is completed and ready for market. If an uncased tubing is required, the lead may be removed and used again, leaving a vulcanized-rubber product with a bore of practically uniform diameter, with walls of any desired density and having any desired amount of flexibility,-results in themselves heretofore unattained, except with much greater expense than is involved in my method.

For the purpose of providing the soft-rubber tubing with the tubing of lead, either for a permanent or temporary use, I prefer to employ the method set forth in my application for Letters Patent, filed concurrently herewith, Serial No. 287,269; but other methods or apparatus may be employed. Under some conditions the old process of folding lead about a core, instead of using liquid lead in a press, may be employed.

The amount of tubing produced in a single bath is limited only by the cubic capacity of the latter. A single bath may contain several reels and each may be given a different degree of flexibility and compactness, or they may all be substantially the same in this regard when finished—a very valuable result of my method, unattainable by any other method with which I am acquainted.

My invention is to be carefully distinguished from a method of forming fabric-covered vulcanized tubing by coating the interior of a tubular fabric with rubber combined with sulphur, filling the bore with water, and subjecting it to a vulcanizing temperature in a closed vessel, presenting an external pressure on the tube. Such a method will not produce the result sought by me, because of the difficulty of regulating the temperature and pressure in the vessel and in the bore and the impossibility of testing the character of the product before its removal from the vessel. Under any circumstances, with such a process, the removal cannot take place without destroying the ability of the apparatus to carry on the method, by withdrawing the heat and pressure therein. This is not so by my process. It is to be distinguished, also, from a process in which a heating-bath for solid rubber is employed, in which no metal coating is necessary or desirable, the bath containing sulphur for vulcanization, (if desired, instead of combining the sulphur with the rubber,) and a metal mold being used, merely as a receptacle for the rubber during vulcanization, and not to resist any pressure from the inside or to present a permanent coating therefor. It is to be distinguished, also, from a process involving the employment of a non-flexible metal tubing to receive the rubber, which, besides making it impossible to vulcanize great lengths of rubber tubing, renders it difficult to obtain any definite degree of flexibility in the rubber tubing, because of the impossibility of access; and in this connection it may be said that, practically, the opportunity to inspect the material undergoing treatment is of the highest advantage, whether accurate theories as to the condition at a stated time are established or not.

What I claim as new, and desire to secure by Letters Patent, is—

1. The method of producing vulcanized-gum tubing, which consists in incasing the plastic-gum tube, combined with a vulcanizing substance, in a flexible metal tube, introducing and retaining an expansible fluid in the bore of the tube, and thereupon coiling and immersing the whole in an open bath having a proper vulcanizing temperature, as set forth.

2. The method of producing vulcanized-gum tubing, which consists in incasing the plastic-gum tube, combined with a vulcanizing substance, in a flexible metal tube, introducing and retaining an expansible fluid in the bore of the tube, and thereupon coiling and immersing the whole in a bath of paraffine or similar oil, maintained at a vulcanizing heat, contained in an unsealed vessel, as set forth.

3. The method of producing vulcanized-gum tubing with a permanent continuous coating of metal, which consists in forming a tube of plastic gum in the usual manner, applying a vulcanizing substance thereto, covering the tube, while soft, with a flexible continuous casing of metal, and immersing the whole in an open bath having a proper vulcanizing temperature, as set forth.

4. The method of producing flexible vulcanized-gum tubing with a permanent continuous coating of metal, which consists in covering the formed plastic-gum tube, provided with a vulcanizing substance, with a flexible continuous casing of metal, introducing and confining an expansible fluid in the bore, and thereupon coiling the tubing and immersing it, while coiled, in an open bath having a vulcanizing temperature, as set forth.

HENRY B. COBB.

In presence of—
M. J. BOWERS,
J. W. DYRENFORTH.